C. H. HAPGOOD.
AUTOMATIC WEIGHING SCALE.
APPLICATION FILED APR. 3, 1915.

1,248,322.

Patented Nov. 27, 1917.
2 SHEETS—SHEET 1.

WITNESSES:

INVENTOR.
Clarence H. Hapgood
BY George R. Frye
ATTORNEY

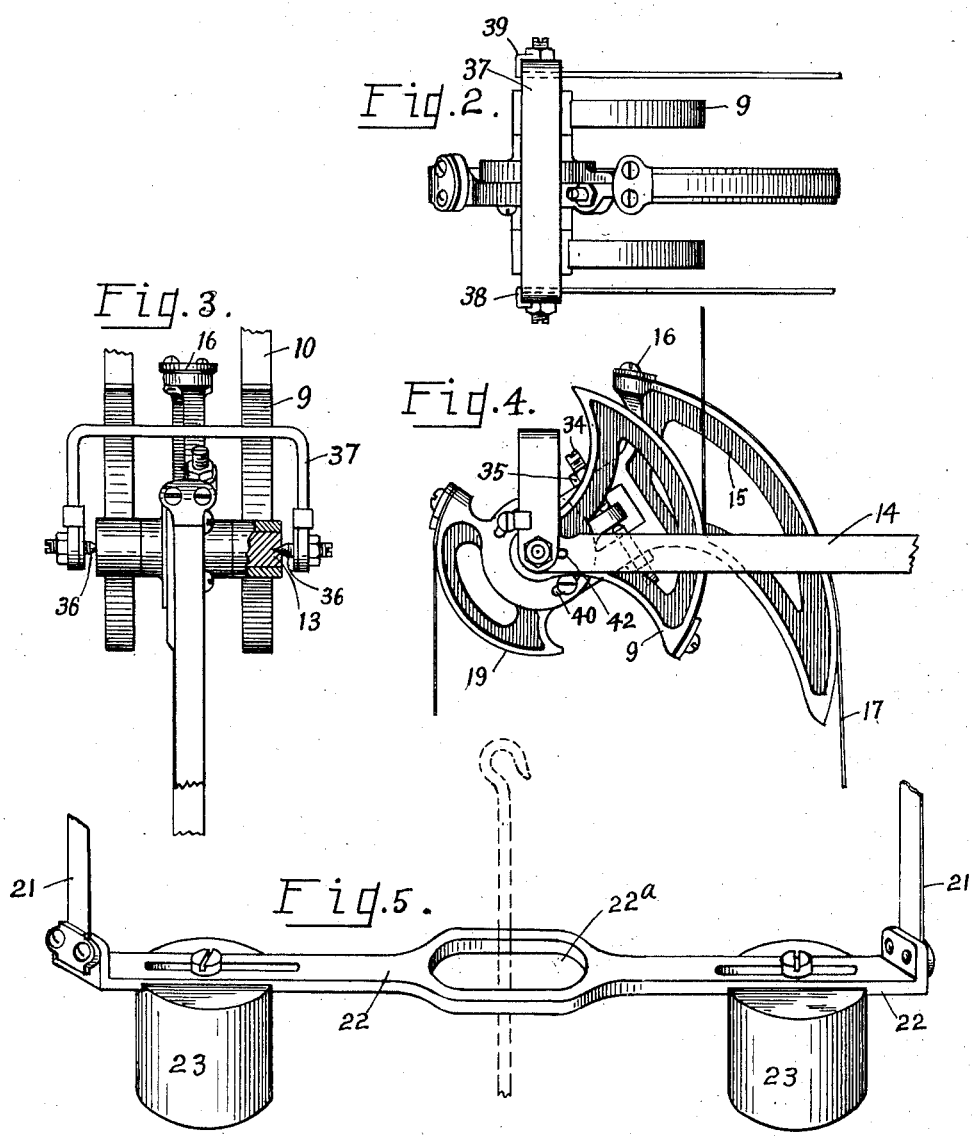

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

AUTOMATIC WEIGHING-SCALE.

1,248,322.

Specification of Letters Patent.

Patented Nov. 27, 1917.

Application filed April 3, 1915. Serial No. 18,867.

*To all whom it may concern:*

Be it known that I, CLARENCE H. HAPGOOD, residing at Toledo, in the county of Lucas and State of Ohio, have invented new and useful Improvements in Automatic Weighing-Scales, of which the following is a specification.

My invention relates to automatic weighing scales of the gravity type, one characteristic of which is that in order to secure accurate weighing it is necessary that the scales be leveled or adjusted with reference to the vertical, otherwise the zero marking on the scales does not correspond with the true zero position of the index hand and correct indication of the weights of articles weighed is impossible. In order to overcome this difficulty I propose to use a pair of oppositely-disposed weight-supporting members arranged to conjointly suspend through flexible supports a load-offsetting weight which is free to swing or move laterally with respect to the vertical center line of the scale without disturbing the accuracy of the indicating mechanism, the weight-supporting members being so arranged as to automatically rock under such swinging movement of the weight to allow the flexible supports on one side of the weight to be unwound from one supporting member exactly in proportion as the flexible supports on the opposite side of the weight are taken up by the other supporting member.

The primary object of my invention is to improve scales of this character by increasing their accuracy of indication and diminishing their liability to error.

A further object of my invention is to provide a simple, efficient and inexpensive weighing scale that is always ready for immediate use and will render accurate results under many varying conditions.

With the above and other objects in view which will more readily appear as the invention is better understood, my invention consists in the novel construction, combination and arrangement of parts to be hereinafter more fully described and particularly pointed out in the subjoined claims.

Reference is to be had to the accompanying drawings illustrating a preferred embodiment of my invention, and wherein similar reference numerals designate similar parts throughout the several views.

In the drawings:—

Fig. 2 is a detail plan view of one of the weight-supporting members.

Figs. 3 and 4 are respectively end and side elevations thereof, and

Fig. 5 is a detail perspective view of the counter-balancing weights and equalizer bar.

Figure 1:
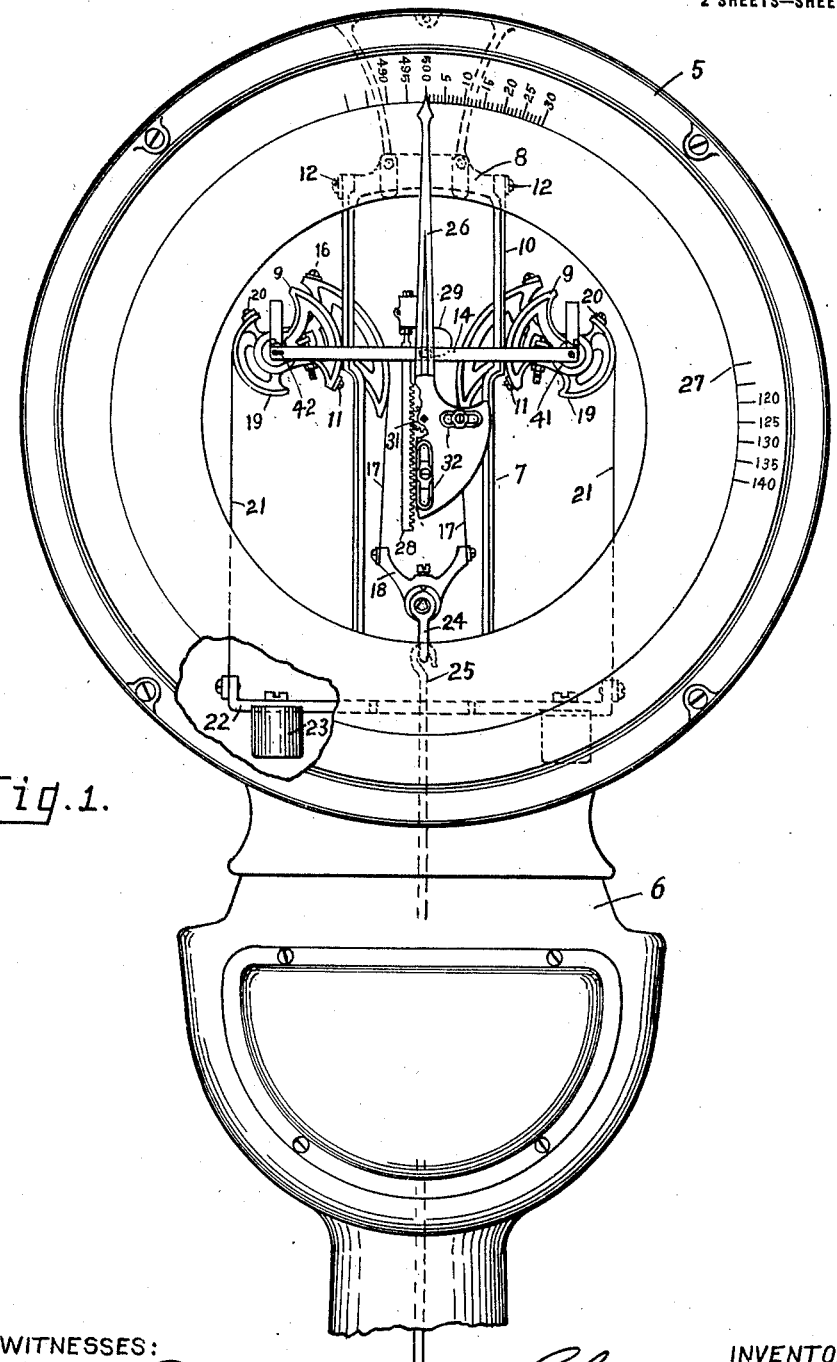
Figure 1 is a front elevation, with portions broken away, of the upper portion of a scale embodying my invention.

In the drawings, the reference character 5 designates a scale housing adapted to inclose the weighing mechanism of the scale and supported upon a suitable column 6, the lower end of which is associated with the base of the scale (not shown) adapted to inclose the platform lever mechanism for supporting the platform of the scale (not shown). The weighing mechanism of the scale comprises a rectangular frame having four vertical pillars 7 suitably supported from the wall of the scale housing and secured together at the top and bottom by cross-pieces 8. The pillars 7 form bearings or tracks for rocker segments 9 forming part of the oppositely-disposed weight-supporting members which are supported in position by flexible ribbons 10 of steel or other suitable metal fastened to the lower ends of the segments, as at 11, and at their upper ends to the pillars, as at 12, being thus interposed between the pillars and the segments at every position of the latter. The hubs of the segments 9 are secured upon shafts 13 and the two shafts are connected together by side bars 14 formed substantially as shown in Fig. 1, the segment shafts and side bars forming a rectangular frame flexibly connected and capable of automatic adjustment as hereinafter set forth. The segments 9 are four in number, there being a pair upon each side of the rectangular frame, the hub members of each pair being secured adjacent the ends of a common shaft 13. (See Fig. 3).

Intermediate the members of each pair of supporting segments 9 is a somewhat larger segment or eccentric 15, the periphery or bearing surface of which is preferably shaped to conform throughout with a spiral cam, this segment being also fixed to the shafts 13 and extending at its periphery between the pillars upon the same side of the rectangular frame. Each of the segments 15 is connected at its upper end, as at 16, to a flexible metallic ribbon 17, which extends over the peripheral face of the segment and is attached at its lower end to an equalizer bar 18. The equalizer bar 18 is pivotally connected with the link 24, which link is secured upon the upper end of the hook-rod 25, the lower end of which is suitably connected to the platform levers (not shown) supporting the scale platform. The hook-rod 25 preferably passes through an opening 22ª in the equalizer bar 22 (see Fig. 5), though this construction is not essential and may be changed. Also secured to the shafts 13 and extending in opposite direction therefrom from the supporting segments 9 is a pair of weight-carrying segments 19, to the upper portion of which is secured, as at 20, a pair of flexible supporting ribbons or bands of steel or other suitable metal 21, the lower ends of which are connected to the opposite ends of an equalizer bar 22 upon which are adjustably mounted a pair of counter-balancing weights 23, as clearly shown in Fig. 5. The construction on both sides of the weighing mechanism is the same, and the ribbons 17 and 21 being respectively attached to opposite ends of the equalizer bars 18 and 22, if the scale be slightly tilted in the plane of the face of the dial and the counter-balancing weights shifted laterally in the same direction it will have no effect upon the position of the link 24, since the amount of ribbon taken up by the segments on one side of the rectangular frame will be compensated by that given up by the other, the equalizer bars 18 and 22 tilting slightly to adjust themselves to the unequal working lengths of the ribbons.

An indicator hand 26 is pivoted concentric with the indicator dial 27 and the casing 5 and is revolved from the side bars 14 of the rectangular frame by a vertically-disposed rack 28 attached by a resilient connecting member 29 to the bar 30 pivotally mounted in the side bars 14 substantially centrally of the length thereof. The rack 28 is in mesh with a pinion 31 (see Fig. 1) mounted on the journal of the indicator hand. The hand is preferably formed of sheet metal and adjacent its pivotal point is expanded into a plate which is appropriately slotted, as at 32, to receive small adjustable weights for accurately counter-balancing the hand. The resilient connecting member 29 is preferably connected to the bar 30 adjacent the center thereof, and the ends of the bar 30 are formed as trunnions loosely fitting in openings in the side bars 14.

Means may be provided for adjusting the supporting segments 19 and the cam or eccentric segments 15 relatively to each other, as, for example, the hub of the segment 19 may be provided with a radially extending lug 33, and oppositely extending adjusting screws 34 may be threaded in the frame of the cam 15, as clearly shown in Fig. 4, suitable slots 40 being provided in the hubs to allow relative turning movement. The ends of the adjusting screws 34 engage opposite sides of the radial lug 33 and are locked in any adjusted position by lock-nuts 35.

In the embodiment herein shown, the shafts 13 are pivotally mounted upon pivots 36, having cone-shaped pivot points (see Fig. 3) and adjustably mounted in the legs of the U-shaped end-pieces 37 which coöperate with the side bars 14 to form a flexible supporting frame. The side bars 14 are preferably formed with a straight elongated body portion having upturned arms 38 at their opposite ends, the upturned arms being adapted to lie closely against the inner surfaces of the U-shaped end-pieces 37, as shown in Fig. 2, and are provided with suitable lugs 39 bent to extend across the edges of the U-shaped end-pieces though not in contact therewith, allowing a shifting of the side bars relatively to the end-pieces while maintaining these end-pieces 37 in an upright position. Adjacent one end each of the side bars 14 is provided with an aperture 41 of slightly greater diameter than the diameter of the pivots 36, while adjacent its opposite end each side bar is provided with an elongated slot 42 (see Fig. 1). This flexible frame connecting the shafts 13 allows of a reasonable derangement of the assembled parts of the weighing mechanism of the scale in any direction, as, for example, when the scale is thrown out of level position the lifting of one end of the weight carrying bar 22 above its normal position would be compensated for by the corresponding falling of the other end of the bar 22 and a corresponding elevation and lowering of the side bars 14 of the flexible frame would be effected. Also a twisting of the flexible frame such as the elevation of one end of one of the side bars 14 while the adjacent end of the opposite side bar is lowered is permitted without binding the pivots in the shafts 13 or affecting the free and unrestricted rocking of the rocker segments when a pull is exerted upon the equalizer bar 18, as when a load is placed on the scale platform.

Also it is to be particularly noted that the connection of the rectangular flexible frame with the indicating mechanism of the scale is unaffected by the shifting of the shafts 13 due to any of the deformations of the frame mentioned above, the tilting of the side bars 14 as when one shaft is elevated and the other shaft correspondingly lowered, or a deformation of the rectangular frame resulting in the lifting of one end of one side bar while the adjacent end of the other side bar is lowered, merely rocking the side bars of the flexible frame on the trunnions of the central bar 30 of the frame, through which connection is made to the indicating mechanism of the scale, this central bar 30 being at all times and under all conditions in the same position as long as no pull is exerted on the equalizer bar 18.

When a pull is exerted on the equalizer bar 18, as when a load is placed upon the scale platform, the counter-balancing weights 23 are simultaneously elevated to offset the weight of the load, the segments 9 advancing upwardly along the ribbons 10 supported by the pillars 7, and the cams 15 and segments 19 being oppositely rocked to unwind the ribbon 17 from the cams and to wind the ribbons 21 upon the segments 19, the upward movement of the segments 9 carrying the shafts 13 and the rectangular frame upward. The upward movement of the rectangular frame elevates the central bar 30 and the rack 28 carried thereby, the movement of the rack rotating the pinion 31 meshing therewith and the indicator hand through an appropriate arc to indicate on the dial 27 the weight of the load on the platform. When the load is removed from the plaftorm, the falling of the weights 23 will cause the return of the rectangular frame and the parts associated therewith to their original position.

The bearing surfaces of the segments 9 and 19 are preferably formed as true arcs of circles, and the bearing surfaces of the members 15 might also be so formed but in that event the rotary travel or angular displacement of the indicator hand on the chart would not correspond increment for increment with the addition of load to the scale platform, for the reason that it has been found that the turning movement or torque of the segments increases more rapidly at some portions of their paths than at others. Therefore, if the bearing surfaces of all the segments were true arcs of circles the distance between the weight indications upon the chart must necessarily be varied. In order, however, to correct for this variation in the mechanism itself and employ a chart having accurately spaced weight indications, I may vary the bearing surfaces of the segments 9 and 19 or either of them, but I have herein shown and preferably construct these segments 9 and 19 with bearing surfaces of true arcs of circles and vary the bearing surface of the segment 15, making it eccentric with respect to the other segments and with a bearing surface substantially that of a portion of a spiral cam so that each equal increment of weight from zero to the capacity of the scale is represented by the same angular displacement on the rotary chart. Also the cam 15 is made angularly adjustable with relation to the shaft 13 and the other segments, substantially as above set forth.

It will be clear that with this structure any moderate displacement of the scale from its true or level position with reference to the vertical will not affect the accuracy of the weight for the unwinding of one of the ribbons 21 from its segment 19 as the equalizer bar 22 shifts will be compensated for by a corresponding winding of the other ribbon on the opposite segment.

It is to be understood that any suitable platform and platform lever mechanism may be employed in connection with the weighing mechanism of the scale, the weighing mechanism herein shown being designed to satisfactorily operate when employed in various forms of scales, as, for example, in dormant, portable or hanging scales.

While it will be apparent that the illustrated embodiment of my invention herein shown is well calculated to adequately fulfil the objects of the invention primarily stated, it will be understood that the construction is suceptible to modification, variation and changes without departing from the spirit and scope of the invention as set forth in the subjoined claims.

Having described my invention, I claim:

1. In a weighing scale, weighing mechanism comprising a pair of oppositely-disposed weight-supporting elements suspended from a fixed portion of the scale, a weight flexibly supported from both of the weight supporting elements, a frame connecting the weight-supporting elements and movable therewith, indicating means and connections for operating the indicating means upon movement of the frame.

2. In a weighing scale, the combination of weighing mechanism including oppositely-disposed rocker segments suspended from a fixed portion of the scale and having a pendant weight flexibly supported therefrom, indicating mechanism, and a flexible frame for connecting the rocker segments with the indicating mechanism.

3. In a weighing scale, the combination of weighing mechanism including oppositely-disposed rocker segments suspended from a fixed portion of the scale and having a pendant weight flexibly supported therefrom, indicating mechanism, and a flexibly connected rectangular frame for connecting the rocker segments with the indicating mechanism.

4. In a weighing scale, the combination of weighing mechanism including oppositely-disposed rocker segments suspended from a fixed portion of the scale and having a pendant weight flexibly supported therefrom, indicating mechanism, and a flexible frame having side bars and end pieces loosely connected together for connecting the rocker segments with the indicating mechanism.

5. In a weighing scale, the combination of weighing mechanism including oppositely-disposed rocker segments suspended from a fixed portion of the scale and having a weight flexibly suspended therefrom, a flexible frame for connecting the rocker segments having side bars and end pieces loosely connected together and a central bar pivotally mounted in the side bars, and indicating mechanism connected with the central bar of the frame.

6. In a weighing scale, weighing mechanism comprising oppositely-disposed weight-supporting elements and a pendant weight secured therefrom, each of said weight-supporting elements having a plurality of rocker segments, connections from certain of the segments for suspending the weight-supporting elements, connections from others of said segments for supporting the pendant weight, and connections from others of said segments to the scale platform.

7. In a weighing scale, weighing mechanism comprising oppositely-disposed weight-supporting elements and a pendant weight secured therefrom, each of said weight-supporting elements having a plurality of rocker segments, some of said segments being adjustable relatively to the others, connections from certain of the segments for suspending the weight-supporting elements, connections from others of said segments for supporting the pendant weight, and connections from others of said segments to the scale platform.

8. In a weighing scale, weighing mechanism comprising oppositely-disposed weight-supporting elements and a pendant weight secured therefrom, each of said weight-supporting elements having a plurality of rocker segments, some of said segments having a cam bearing surface, connections from certain of the segments for suspending the weight-supporting elements, connections from others of said segments for supporting the pendant weight, and connections from others of said segments to the scale platform.

9. In a weighing scale, weighing mechanism comprising oppositely-disposed weight-supporting elements and a pendant weight secured therefrom, each of said weight-supporting elements having a plurality of rocker segments, some of said segments having spiral cam bearing surfaces, connections from certain of the segments for suspending the weight-supporting elements, connections from others of said segments for supporting the pendant weight, and connections from the cam segments to the scale platform.

10. In a weighing scale, a housing, a plurality of bearing tracks carried by said housing, weighing mechanism including a counter-balancing weight and oppositely-disposed weight-supporting elements each comprising rocker segments engaging the bearing tracks, other segments for suspending the counter-balancing weight, and cam segments connected with the scale platform.

11. In a weighing scale, weighing mechanism comprising oppositely-disposed rocker segments suspended from a fixed portion of the scale and a load counter-balancing weight comprising an equalizer bar connected with said rocker segments and having a plurality of weights adjustably secured thereon.

CLARENCE H. HAPGOOD.

Witnesses:
H. S. BERGEN,
C. WM. FESSENDEN.